United States Patent [19]

Kramer

[11] 4,273,378
[45] Jun. 16, 1981

[54] VEHICLE DOOR, ESPECIALLY FOR A DRIVER'S CAB

[75] Inventor: Peter Kramer, Spich, Fed. Rep. of Germany

[73] Assignee: Klöckner-Humboldt-Deutz Aktiengesellschaft, Cologne, Fed. Rep. of Germany

[21] Appl. No.: 927,297

[22] Filed: Jul. 24, 1978

[30] Foreign Application Priority Data

Jul. 22, 1977 [DE] Fed. Rep. of Germany ....... 2733166

[51] Int. Cl.³ ............................................. B60J 5/04
[52] U.S. Cl. ................................. 296/146; 244/129.5
[58] Field of Search ............... 296/146, 31 P; 52/802, 52/803, 805, 309.1, 309.17; 244/129.5

[56] References Cited

U.S. PATENT DOCUMENTS

| | | | |
|---|---|---|---|
| 1,764,668 | 6/1930 | Woodall | 52/805 |
| 1,827,743 | 10/1931 | Groehm | 244/129.5 X |
| 3,084,973 | 4/1963 | Beckley | 296/31 P |
| 3,267,626 | 8/1966 | Daly | 52/805 |
| 3,992,839 | 11/1976 | Burde | 52/802 |
| 4,072,338 | 2/1978 | Lawrence et al. | 296/146 X |
| 4,152,022 | 5/1979 | Cartine | 296/146 |
| 4,184,709 | 1/1980 | Kim | 296/146 X |

Primary Examiner—John J. Love
Assistant Examiner—Norman L. Stack
Attorney, Agent, or Firm—Becker & Becker, Inc.

[57] ABSTRACT

A vehicle door, especially for a driver's cab in vehicles used in agriculture and construction work, with a door frame having a monocoque or shell structure and being provided with an inner and an outer frame part. The outer frame part as well as the inner frame part are preferably made of glass fiber reinforced synthetic material. The outer frame part is relative to the inner frame part fixed in transverse direction by means of webs extending over a considerable circumferential portion of the outer frame part. These webs are provided with surfaces for mutually bracing the outer and the inner frame parts.

9 Claims, 14 Drawing Figures

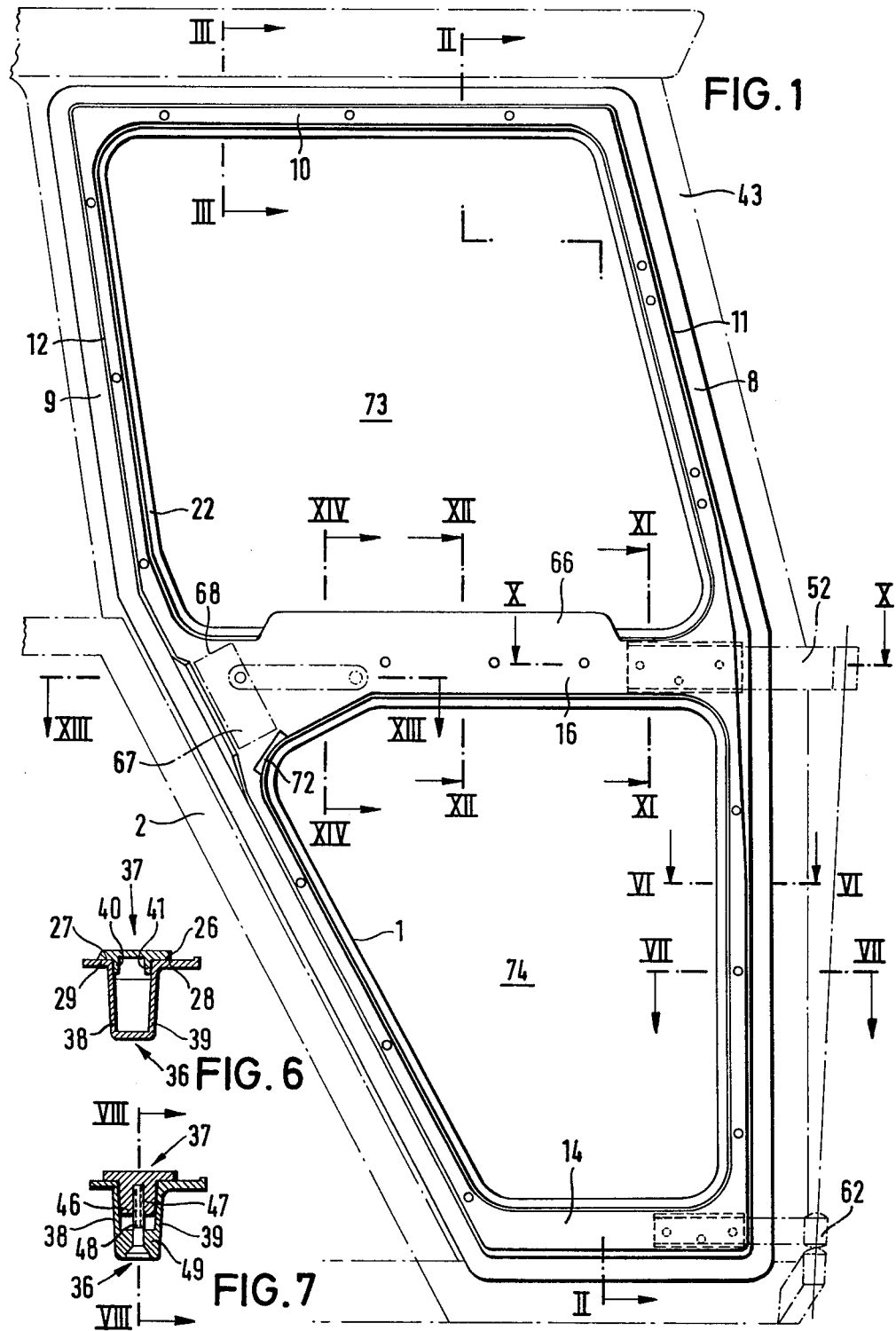

U.S. Patent Jun. 16, 1981 Sheet 2 of 3 4,273,378
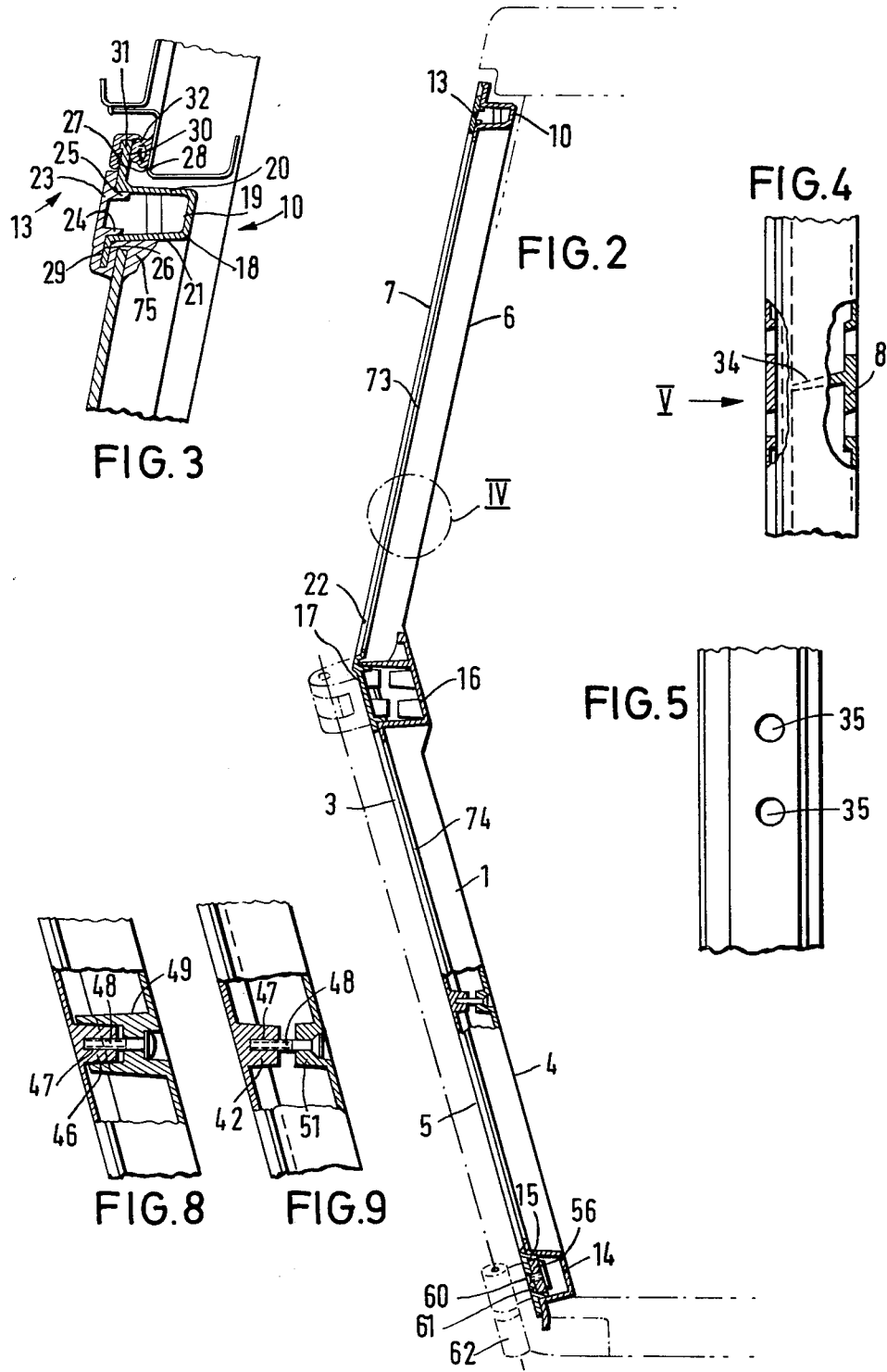

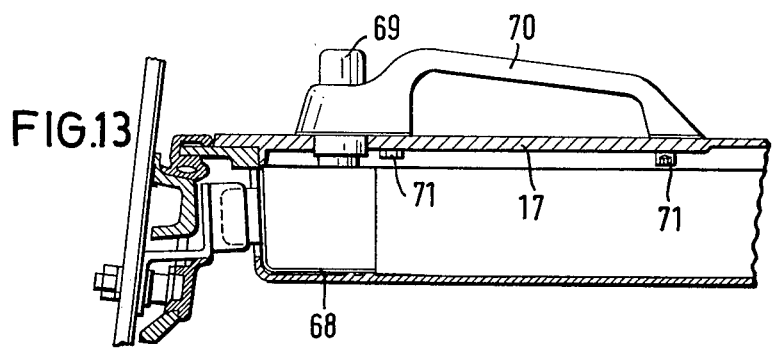
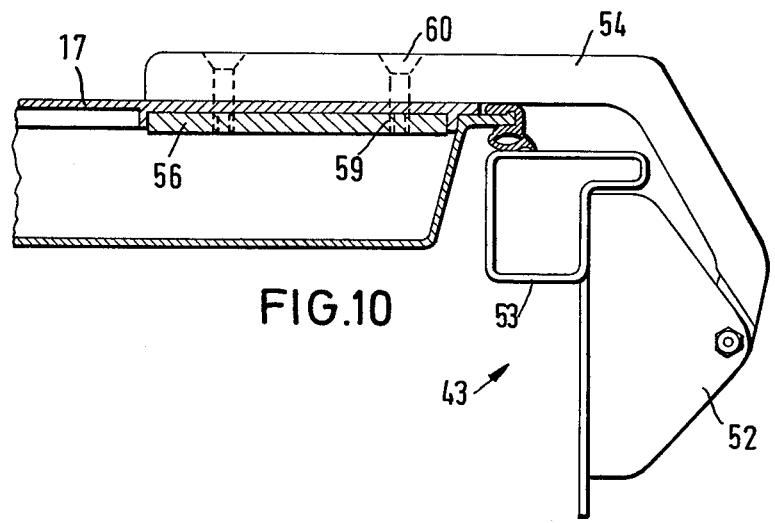
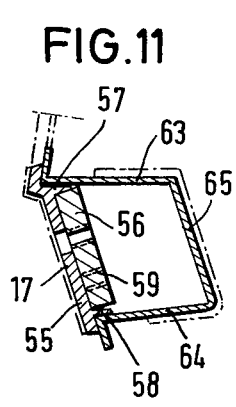
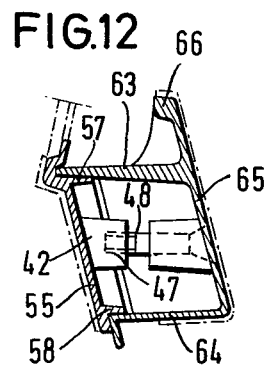
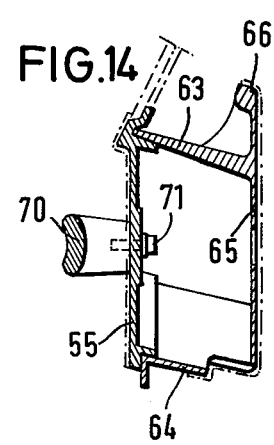

VEHICLE DOOR, ESPECIALLY FOR A DRIVER'S CAB

The present invention relates to a vehicle door, especially for the driver's cab of an agricultural and/or construction vehicle, with a formed door frame having an inner and an outer frame section.

For health reasons, and due to the specific rough use which driver's cabs of such agricultural and construction vehicles undergo, the problem arises to design especially the inner surfaces of the vehicle doors in such a way that, without special porous soundabsorbing materials, as slight a reflection or radiation of noise will be conducted through the body. The additional problem exists, so to form the outer surface of the vehicle door of suitably priced means that these surfaces do not require constant maintenance during use. Due to the dynamics of oscillation or vibration, a resiliently supported driver's cab-control unit at the same time imposes the requirement for a lightweight vehicle door. Too heavy of a door results not only in great expense, but also in too stiff a spring suspension for the operator's position. Too weak of a spring suspension with a heavy driver's cab would result in an unsteady position of the driver's cab and would hinder operation.

It is, therefore, an object of the present invention to provide a vehicle door of the above mentioned general typw which, in a particularly economical manner of construction, permits an optimum design with regard to its noise conducting properties with lightweight and, as much as possible, maintenance free inner and outer surfaces of the frame sections.

This object and other objects and advantages of the present invention will appear more clearly from the following specification in connection with the accompanying drawings, in which:

FIG. 1 is a side view from within a partially shown driver's cab illustrating the vehicle door of the present invention;

FIG. 2 is a cross section taken along the line II—II through the vehicle door of FIG. 1;

FIG. 3 is an enlarged cross section taken along the line III—III through the upper arm of the vehicle door of FIG. 1;

FIG. 4 is an enlarged cross section taken in the region of the dot-dash encircled portion IV of FIG. 2 through the forward door side piece above the section serving to connect the side piece with an upper hinge;

FIG. 5 shows an enlarged side view of the forward door side piece in the region of the arrow V of FIG. 4;

FIG. 6 is an enlarged cross section taken along the line VI—VI of FIG. 1 through the upper forward door side piece;

FIG. 7 is an enlarged cross section taken along the line VII—VII of FIG. 1 through the forward door side piece between the two door hinges;

FIG. 8 is a longitudinal section taken along the line VIII—VIII of FIG. 7 through the tensioning means which serve to clamp the inner and outer frame sections and to transversely fix the latter against one another.

FIG. 9 shows an enlarged longitudinal section through a clamping element which likewise serves for the clamping of the two frame sections and is arranged between two clamping elements according to FIGS. 7 and 8 in the region of the cross pieces and the lower or upper arm;

FIG. 10 is a partial transverse section taken along the line X—X of FIG. 1 through the section of the vehicle door which serves as the connection with an upper hinge;

FIG. 11 is a transverse section taken along the line XI—XI of FIG. 1 through that portion of the door which serves as a pivot of the upper hinge;

FIG. 12 is a cross section taken along the line XII—XII of FIG. 1 through that section which connects the forward and back side piece of the door;

FIG. 13 shows a horizontal section taken along the line XIII—XIII of FIG. 1 through that portion of the vehicle door which contains the door lock; and FIG. 14 is a cross section taken along the line XIV—XIV of FIG. 1 through that section of the cross piece which supports the handle.

The vehicle door of the present invention is characterized primarily in that:

(a) the outer frame section as well as the inner frame section are plastic or synthetic material structural members reinforced with glass fiber;

(b) the outer frame section is fixed in the transverse direction in relation to the inner frame section by webs which extend over most of the periphery; and (c) the webs which serve for the transverse fixing of the outer frame section in relation to the inner frame section are provided with surfaces serving for the reciprocal bracing of the outer frame section with the inner frame section.

Such a door has the particular advantage that with an especially light weight door frame, the door guarantees little noise conduction through the body without requiring an additional porous outer layer on the inner frame section. In addition, the inventive mode of construction, with high resistance to rolling-over forces, has the advantage that the surface of the outer and inner frame sections requires no constant maintenance in the way of painting or varnishing.

To increase the rigidity of the door frame and to further reduce the reflected noise conducted through the body, it is further proposed according to the present invention that a portion of the webs of the clamping of the two frame sections, which webs serve for transversely bracing the inner frame section with regard to the outer frame section, has clamping surfaces which extend transverse to the inner or outer surfaces of the frame section. A particularly effective bracing of the two frame sections with regard to one another is achieved by arranging the clamping surfaces, which extend transverse to the webs (which serve for transversely bracing the outer frame section relative to the inner frame section), in the region of the corners and/or one of the arms which connect the side pieces of the door. These clamping surfaces are also screwed and/or glued or cemented together.

To simplify the assembly, and especially to create a connection of the two frame sections which assures that there will be no vibration, it is proposed pursuant to a further feature of the present invention that the webs which serve for transversely bracing the inner frame section relative to the other frame section be provided with cone-shaped guide surfaces. In this connection, a particularly simple manufacturing method is obtained for the structural parts which serve for the transverse fixing and for the mutual bracing of the two frame sections, if the cone-shaped guide surfaces of one portion of the webs which serve for the transverse fixing of the inner and outer transverse frame section abut the transversely extending bracing surfaces for bracing the outer frame section with the inner frame section. To reduce the material used and to simultaneously achieve a particularly rigid construction, it is further proposed pursuant to the present invention that the cone-shaped guide surfaces of the webs which serve for the transverse fixing be partially designed as U-shaped webs. In this way, a mutual bracing of the two frame sections is achieved in a practical manner by arranging a dog-shaped elevation and reinforcement between the arms of the U-shaped webs for receiving a bracing bolt.

Pursuant to a further feature of the present invention, it is proposed that one or more of the U-shaped webs which serve for transversely bracing the inner frame section in relation to the outer frame section be designed for receiving a mounting or the like of a hinge. This has the particular advantage that, with structurally simple means, a vibration-free connection between the vehicle door and the driver's cab is made possible. In this connection, a simple and functionally secure as well as easy to manufacture solution is achieved by forming the arm or arms of a U-shaped web as a transverse fixing for the hinge mounting which is braced or glued with the transverse piece of the U-shaped web.

In the event that the upper part of the door and the lower part of the door are at an obtuse angle, for instance nearly 180°, to one another, it is proposed, in order to prevent the accumulation of dew or condensed water, that the webs, which serve for the transverse bracing and which extend transverse to the upwardly directed side pieces, be arranged essentially horizontal to a vertical plane which extends through the longitudinal central axis of the vehicle.

As a further transverse strengthening of both frame sections, it is further proposed that the upwardly directed side pieces of the inner and outer frame section, preferably in the region of the vertex of the obtuse angle, each be bridged by an essentially horizontally extending transverse web. In this connection, not only manufacturing-wise but also a structurally particularly rugged solution results for those structural components of the vehicle door which serve for the locking or fastening of the door. The horizontal transverse web of both frame sections, and that side piece of the inner and outer frame section which faces away from the hinge and is directed upwardly, serve to receive a door lock which can be inserted prior to the connection of the outer frame section with the inner frame section. For replacing the door lock, it is useful if the upwardly directed side pieces of both frame sections, which side pieces essentially receive the door lock, be provided with an opening in the region of their connection with the associated transverse web. Through this opening, the door lock can be removed.

Furthermore, for easy handling and double utilization of structural parts, it is proposed that the transverse web which connects the two upwardly directed side pieces of the inner frame section be preferably designed over a significant portion of its length as an inner door handle.

Finally, it is further proposed pursuant to the present invention that the inner frame section, on its two upwardly directed side pieces and on its upper and lower arm, be provided with a projection which serves to receive a sealing bead provided with a sealing lip. In this connection, it is useful that the projection for the sealing bead be provided with a thicker portion on one or both sides. The thicker portion serves as a mounting for the sealing bead and preferably encircles the inner frame section.

Referring now to the drawings in detail, FIG. 1 shows an inner frame section 1 of a vehicle door of the driver's cab 2 of a tractor or a prime mover. The driver's cab 2 is not shown in greater detail. The inner frame section 1 comprises a tough, hard set plastic or synthetic material which is reinforced with glass fibers and is preferably manufactured by the hot press method. The inner frame section 1 is braced with an outer frame section 3 both of which are formed from the same material and by the same manufacturing method. The frame sections 1 and 3 are braced with one another by means of subsequently described bracing elements. The inner and the outer frame sections 1 and 3 have a lower portion 4 and 5 respectively as well as an upper portion 6 and 7 respectively, and these portions are inclined toward one another at an obtuse angle, for instance nearly 180° (FIG. 2).

The inner frame section 1 is provided with a forward side piece 8 and a rear side piece 9, which, at the top, are connected with one another by an upper arm 10. Similarly, the inner frame section 1 is provided with a forward side piece 11 and a rear side piece 12, which are connected with one another by means of an upper arm 13 (FIG. 2). At the bottom, the two side pieces 8, 9 of the inner frame section 1 are bridged by a lower arm 14, while the outer side pieces 11, 12 are connected by means of an arm 15 (FIG. 2). In the region of the vertex of the obtuse or nearly 180° angle, the two inner side pieces 8, 9 are interconnected by means of an inner transverse bar 16, while the outer side pieces 11, 12 are bridged by an outer transverse strut 17.

As shown in FIG. 3, to transversely fix the two frame sections 1, 3, the inner arm 10 is provided with a U-shaped web 18 which extends over the entire length of the arm 10. The U-shaped web 18 is provided with a transverse web 19 which extends in the outer plane of the upper portion of the side pieces 8, 9. Arms 20, 21 are connected to the transverse web 19. These arms 20, 21 essentially lie in a horizontal plane and are arranged so as to slightly taper toward one another. The arms 20, 21 extend over at least three quarters of the thickness of the formed, essentially self-contained door frame 22. A U-shaped web 23, which likewise extends over the length of the upper outer arm 13, engages the U-shaped web 18 under slight preload with its arms 24, 25, which are slightly slanted towards one another. Clamping surfaces 26 and 27 are connected to the two arms 24, 25 and extend transverse thereto. Associated clamping surfaces 28, 29 of the angled off portions of the arms 20 and 21 rest on the clamping surfaces 26 and 27 in a preloaded state. The clamping surfaces 28 and 29 preferably extend over the length of the upper inner arm 10. The angled off portion of the arm 20 is formed by a projection 30 which extends over the outer periphery of the inner frame section 1. Both sides of the end of the projection 30 are provided with a thicker or bead portion 31 which is embraced under preload by a circular sealing bead 32 which serves to seal the frame 22 (FIG. 2) relative to the frame structure 43 of the driver's cab 2. In order to maintain a preload against the frame structure 43 of the driver's cab, the sealing bead 32 is preferably provided with a hollow lip 33 (FIG. 3) which rests against the framework 43 when the door is closed.

To strengthen the mounting of an outer mirror, the forward door side piece which is formed in the upper portion 6 by the inner and outer side pieces 8 and 9, is provided with a transverse web 34 which is produced in one piece with the side piece 8. The transverse web 34 is provided between two receiving bores 35 (FIGS. 4 and 5).

As shown in FIGS. 1 and 6, the side pieces 8, 9 of the forward door side piece are likewise transversely fixed to one another by means of a plurality of U-shaped webs 36 and 37 which are uniformly distributed over the length of the side pieces and are provided with arms 38 and 39, and 40, 41, which are arranged so as to be wedge-shaped toward one another. In the braced state, the arms 38, 39 embrace the associated arms 40, 41 under preload. At the same time, the abutting clamping surfaces 26, 28 and 27, 29 are clamped together and, if necessary, are glued together in the region of the corners of the frame 22. In a similar manner to that shown in FIGS. 1 and 6, the rear door side piece formed by the two side pieces 9, 12 is at the same time transversely fixed and clamped by means of a plurality of U-shaped webs 36 and 37 which are distributed over the length of the rear door side piece.

As shown in FIGS. 7 and 8, to brace the inner frame section 1 with the outer frame section 3, the U-shaped webs 37 distributed over the periphery of the door frame are provided, according to need, with respective dog-shaped projections and reinforcements 46. The dog-shaped projections and reinforcements 46 have a threaded bore 47 for respective clamping screws 46. For strengthening purposes, the opposite portion of the arms 38, 39 are preferably provided with a dog-shaped reinforcement 49 through which the clamping screw 48 passes. As shown in FIG. 9, further clamping elements, which are likewise distributed over the periphery of the frame sections 1, 3, are distributed between the clamping elements of FIGS. 7 and 8. The clamping elements of FIG. 9 are formed by dogs 42 connected as one piece with the inner surfaces of the arms 13 and 15 and the inner surfaces of the side pieces 11 and 12 of the outer frame section 3. The dogs 42 have a threaded bore 47 and a clamping screw 48. The clamping screw 48 in this connection passes through a respective oppositely arranged dog-shaped projection and reinforcement 51 located on the associated arms 10 and 14 and side pieces 8 and 9 of the inner frame section 1.

As shown in FIGS. 2 and 10, the vehicle door, in the region of the transverse bars 16 and 17, is pivotally hinged on a door post 53 of the frame structure 43 of the driver's cabin by means of an angular hinge 52. To connect the frame 22 (FIG. 1) with an angle bracket 54 over the outer transverse bar 17, the latter is provided with a profile formed by a U-shaped web 45 into which is inserted and cemented a steel plate 56. The steel plate 56 is transversely fixed by the two arms 57, 58 (FIG. 11) of the transverse bar 17 and by means of the transverse bar 17 and screws 60 screwed into threaded holes 59 (FIGS. 10 and 11) is connected to the angle bracket 54. As shown in FIG. 2, the lower outer arm 15, in the region of the connection with the forward side piece 11, is similarly connected with a steel plate 56 which is transversely fixed and cemented to the profile of a U-shaped web 61. The steel plate 56 of the lower arm 15 is braced by this arm 15 with a hinge 62 by means of screws 60. In this way, not only the steel plate 56 of the transverse bar 17, but also the steel plate 56 of the lower arm 15 is firmly cemented to the outer frame section 3 prior to uniting the inner frame section 1 with the outer frame section 3.

As shown in FIGS. 11 and 12, at several places on the U-shaped web 55 of the transverse bar 17 between the arms 57, 58 of the web 55, the outer transverse bar 17 is provided with a dog 42 having a threaded hole 47 for receiving a clamping screw 48. The clamping screw 48 is respectively seated in a dog 51 arranged on the inner transverse bar 16 between the arms 63, 64 of a U-shaped web 65. As shown in FIGS. 2 and 12, the inner transverse bar 16 is provided with a handle 66 which is connected as one piece with a U-shaped web 65 and extends over about two thirds of the length of the transverse bar 16.

As shown in FIG. 1, the frame 22 is provided with a door lock 67 which, prior to the connection of the two frame sections 1, 3, is inserted into the mounting 68 essentially formed by the rear side piece 9 and the outer side piece 12. The door lock 67 is screwed to the outer arm 39 of the door side piece 9 by means of screws (not shown). To lock and unlock the door lock 67, a handle 70 (FIG. 13), which is provided with a pusher 69 which acts on a contact of the lock 67, is clamped to the cross bar 17 by means of screws 71 prior to connecting the inner and outer frame sections 1 and 3. Below the position of the door lock 67 shown in FIG. 1, the transverse bar 17 is provided with an opening 72 through which the door lock 67 can be introduced or removed if replacement is required.

The door openings defined by the side pieces 8, 11, 9, 12, the arms 10, 13, 14, 15, and the transverse bars 16, 17, are respectively equipped with safety glass panes 73 and 74. As shown in FIG. 3, a bead-like rubber seal 75, which partially embraces the web-shaped clamping surface 29, serves as mounting for the glass panes 73 and 74. The rubber seal 75, with its bead, embraces not only the associated panes 73 and 74, but also the associated web. The drawings illustrate only one specific embodiment of the present invention, which could be used equally well with a vehicle door for a driver's cab of a tractor or prime mover, according to which the door, adjacent to the mounting member, has an L-shaped portion which extends over a rear fender. By means of this portion, the door is pivotally hinged on hinges on a rear post or the like of a frame structure.

The present invention is, of course, in no way limited to the specific showing of the drawings but also encompasses any modifications within the scope of the appended claims.

What I claim is:

1. A vehicle door for an operator cab of a vehicle used for agricultural and construction purposes which is composed of elements rigidly attached to each other to form a unitary frame structure which includes an outer frame section, and an inner frame section fixed to said outer frame section, at least one of said frame sections being provided with web means having surfaces bracing said inner and outer frame sections with regard to each other in transversly of said inner and outer frame sections, a portion of said web means of one of said frame sections being provided with bracing surfaces engaging oppositely located bracing surfaces of the other one of said two frame sections, said inner and outer frame sections both being of glass fiber reinforced synthetic material, the bracing surfaces of said web means extending transversly of an adjacent portion of the adjoining web means, each frame section comprising an upright front arm and rear arm and also an upper arm and lower transverse arm interconnecting said upright arms, for absorbing transverse and diagonal forces therebetween, the bracing surfaces of said web means being located within the region of one of said upper and lower transverse arms, the bracing surfaces being firmly connected to one of said transverse arms, said web means having conical guiding surfaces of the web means belonging with one of said frame sections having those ends of said web means which are adjacent the other frame section provided with flange means for bracing engagement with said other frame section, said web means having a U-shaped cross section and legs of said U-shaped cross section comprising said conical guiding surfaces, reinforcing means between the legs of said web means for receiving tightening screws therein, at least two of said web means having a U-shaped cross section and having hinge holding means between the legs thereof for receiving hinge means for said vehicle door, said inner frame section being provided with first web means of U-shaped cross section, and the outer frame section being provided with second web means of U-shaped cross section, the legs of said first and second web means being in bracing engagement with each other, said hinge holding means being provided between the legs of said second web means and being fastened thereto with transfer of support forces of hinge means therewith.

2. A vehicle door according to claim 1, in which said door has an upper part with an inner and outer frame section, and also has a lower part with an inner and outer frame section, said upper and lower door parts being inclined toward each other at an obtuse angle, said upper part having upwardly extending arms, and said guiding surfaces extending in a direction transverse to said upwardly extending arms and nearly parallel to a plane extending vertically through the longitudinal central plane of the vehicle for which said door is intended.

3. A vehicle door according to claim 2 said upwardly extending arms of said inner and outer frame sections are respectively bridged by substantially horizontal transverse struts.

4. A vehicle door according to claim 3, in which said struts are arranged substantially within the region of the apex of said obtuse angle.

5. A vehicle door according to claim 3, which includes a hinge, and in which the substantially horizontal transverse struts of both frame sections and that arm of said frame sections which faces away from said hinge serves for receiving a door lock prior to connecting the outer and inner frame sections with each other.

6. A vehicle door according to claim 3, in which the upwardly extending arms of said inner and outer frame sections adapted to receive said door lock have an opening for permitting the exchange of said door lock, said opening being located within the region of connection with the pertaining transverse strut.

7. A vehicle door according to claim 5, in which said transverse strut interconnecting the two upwardly extending arms of said inner frame section is over a portion of its length designed as door handle.

8. A vehicle door according to claim 2 includes said inner frame section having an upper and a lower substantially horizontal arm and said inner frame section having both upwardly extending arms and its upper and lower arms provided with a projection and a sealing bead with sealing lip, said sealing bead being arranged in said projection.

9. A vehicle door according to claim 8, in which said projection for said sealing bead is provided with a thickened portion extending at least on one side of said inner frame section and around the same for holding said sealing bead.

* * * * *